March 15, 1966    S. A. ZARLENG    3,240,411
LOOP CONTROL SYSTEM

Original Filed Dec. 12, 1960    2 Sheets-Sheet 1

INVENTOR.
STEVE A. ZARLENG
BY
ATTORNEY

March 15, 1966  S. A. ZARLENG  3,240,411
LOOP CONTROL SYSTEM
Original Filed Dec. 12, 1960  2 Sheets-Sheet 2
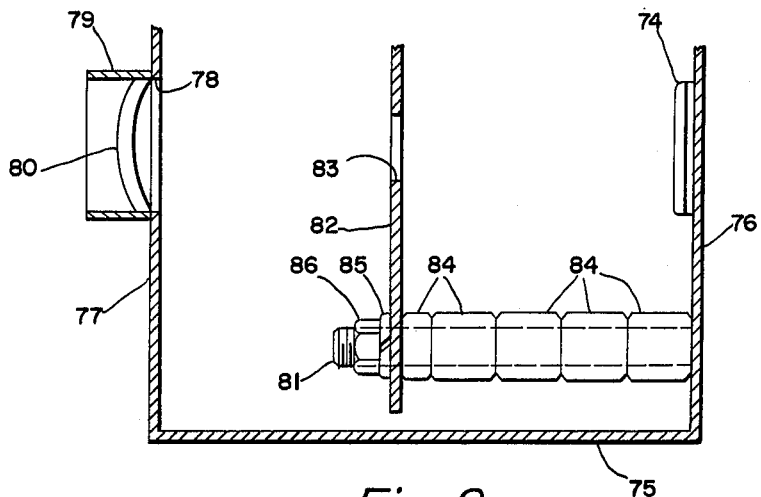
Fig. 2
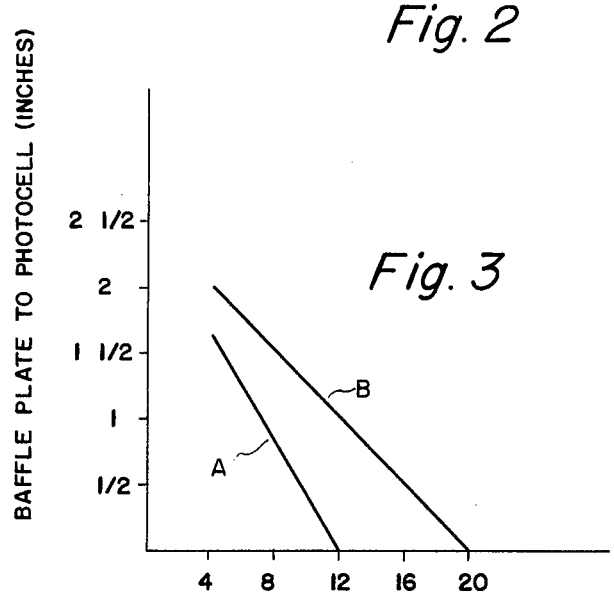
Fig. 3
LIGHT SOURCE TO PHOTOCELL (FEET)
INVENTOR.
STEVE A. ZARLENG
BY 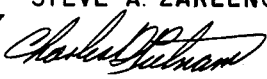
ATTORNEY

United States Patent Office 3,240,411
Patented Mar. 15, 1966

3,240,411
LOOP CONTROL SYSTEM
Steve A. Zarleng, Paris, France, assignor to The Clark Controller Company, Cleveland, Ohio, a corporation of Ohio
Continuation of application Ser. No. 75,180, Dec. 12, 1960. This application Feb. 12, 1964, Ser. No. 346,060
10 Claims. (Cl. 226—42)

This invention relates to electric control systems and more particularly to control systems for controlling and maintaining constant the length of a loop in strip material as it is continuously moving through a process or the like. This application is a continuation of applicant's copending application entitled Loop Control System, Serial No. 75,180 which was filed Dec. 12, 1960, now abandoned.

In many strip processing lines, it is required that the tension in the strip between various processing sections be eliminated. This is accomplished by having the strip hang in slack loops between the sections. To maintain the loop length constant, the strip must be fed into the loop at the same speed that it is withdrawn from the loop.

Also in most strip processing lines, it is required that the strip be continuous. This is accomplished by having the strip unreeled from a reel into a slack loop at a rate faster than it is withdrawn from the loop for traveling through the process. When the end of one reel is reached, it is held and butt welded onto the start of the next reel. During the welding process the strip traveling through the process is not stopped, but is drawn from the strip hanging in the loop.

At the exit end of the processing line another loop is formed to perform the reverse of the above described action. That is, the strip is wound onto a reel and when the reel is full, the reeling action is stopped and the strip cut. While the strip is being cut, the strip travels through the process and into the loop. Therefore, it is necessary to withdraw the strip from the loop during the reeling action at a rate faster than the rate at which the strip is going into the loop.

Heretofore, the length of the loop was determined by the amount of light from a light source which was allowed to impinge upon a bank of phototubes. The signal from the phototubes was fed into an electronic control circuit for controlling the speed of the motors. Because of the vibration of the surrounding equipment, it was necessary to shock mount the tubes and the control equipment and yet, the vibration would adversely affect the life and operation of the phototubes and the electronic tubes used in the control circuit.

The use of phototubes required that a voltage be applied to them for proper operation. When normal line fluctuations of this voltage occurred the output of the phototubes was affected. As the phototubes grew old, their output decreased for the same proportional light intensity. Phototubes are very sensitive to the intensity of the light impinging upon them and thus stray light, such as from the search lights of an overhead crane, would often upset the balance of the loop control.

The preferred embodiment of my invention utilizes a bank of photocells as the light sensitive unit. These are the well known silicon photovoltaic cells, more commonly called "solar cells," which generate an output current directly from the light energy incident upon their surface. They are connected in parallel so their output current is the sum of the individual photocell currents.

A lens is mounted directly before each photocell to restrict its angle of vision and thereby reduce the effect of stray light. A baffle is interposed between each photocell and lens to control the amount of light that strikes or impinges upon the photocell surface. The distance between the baffle and the photocell is made adjustable so that a uniform output can be obtained from the photocells independent of their distance from the light source.

The output of the photocells, which indicates the loop length, is fed into a balanced three stage transistor amplifier having a low input impedance. A negative current feedback is utilized to obtain the low input impedance and also to increase the stability of the amplifier.

The amplifier is connected to be energized by an electrical signal indicative of the strip speed. This causes the amplifier output to be limited proportional to the speed. That is, the percent of regulation will be high when the strip speed is high and low when the strip speed is low.

The amplifier output energizes two opposing control windings of a magnetic amplifier in a differential manner.

The magnetic amplifier has two other control windings which also oppose each other. One of the opposing control windings is energized with a voltage proportional to the speed at which the strip enters the loop, while the other winding is energized with a voltage proportional to the speed at which the strip leaves the loop. These are referred to as a feedback winding and a reference winding respectively.

The output of the magnetic amplifier is connected to energize the field of a D.C. generator and thereby control its output. This output is connected to a D.C. motor which drives the rolls feeding the strip into the loop.

Should the length of the loop decrease due to speeding up of the exit rolls or slowing down of the entry rolls, the magnetic amplifier is energized by its two opposing control windings to correct the difference in speed. Further, the photo-cells will increase their output due to the decrease in the loop length and energize the control winding in a manner to cause the magnetic amplifier to increase its output so the loop length is increased. This action continues until the correct loop length is reached and the speed of the strip entering the loop is the same as its speed leaving the loop.

The reverse correction and energization is made should the loop become lengthened.

Therefore, it is the primary object of my invention to provide a loop control system that will overcome all of the above difficulties.

It is a further object of my invention to provide a loop control system which does not require a source of energy to energize the light sensing devices.

It is also an object of my invention to provide a loop control system where the light sensitive devices may be located at any distance from the light source at which sufficient light amplitude is available, and to provide means to adjust the amount of light falling upon the light sensing devices.

It is still another object of my invention to provide a rugged loop control system which is substantially insensitive to the normal vibrations and shocks occurring at its location of use.

It is still a further object of my invention to provide a loop control system which greatly reduces the installation and maintenance work required.

Another object of my invention is to provide a loop control system where the percent of regulation is in direct proportion to the speed of the strip.

Still another object of my invention is to provide an amplifier having a low input impedance and very stable operating characteristics.

Still other objects and improvements of my invention will become apparent to those skilled in the art when taken in consideration with the following specification and accompanying drawings in which:

FIG. 2 is a sectional view of the photocell enclosure illustrating the relative positions of the photocell, the baffle plate and the lens; and FIG. 3 is a graphic representation showing the desired relationship of the distance between the lens and the light source and the distance between the baffle plate and the photocell.

Figure 1:
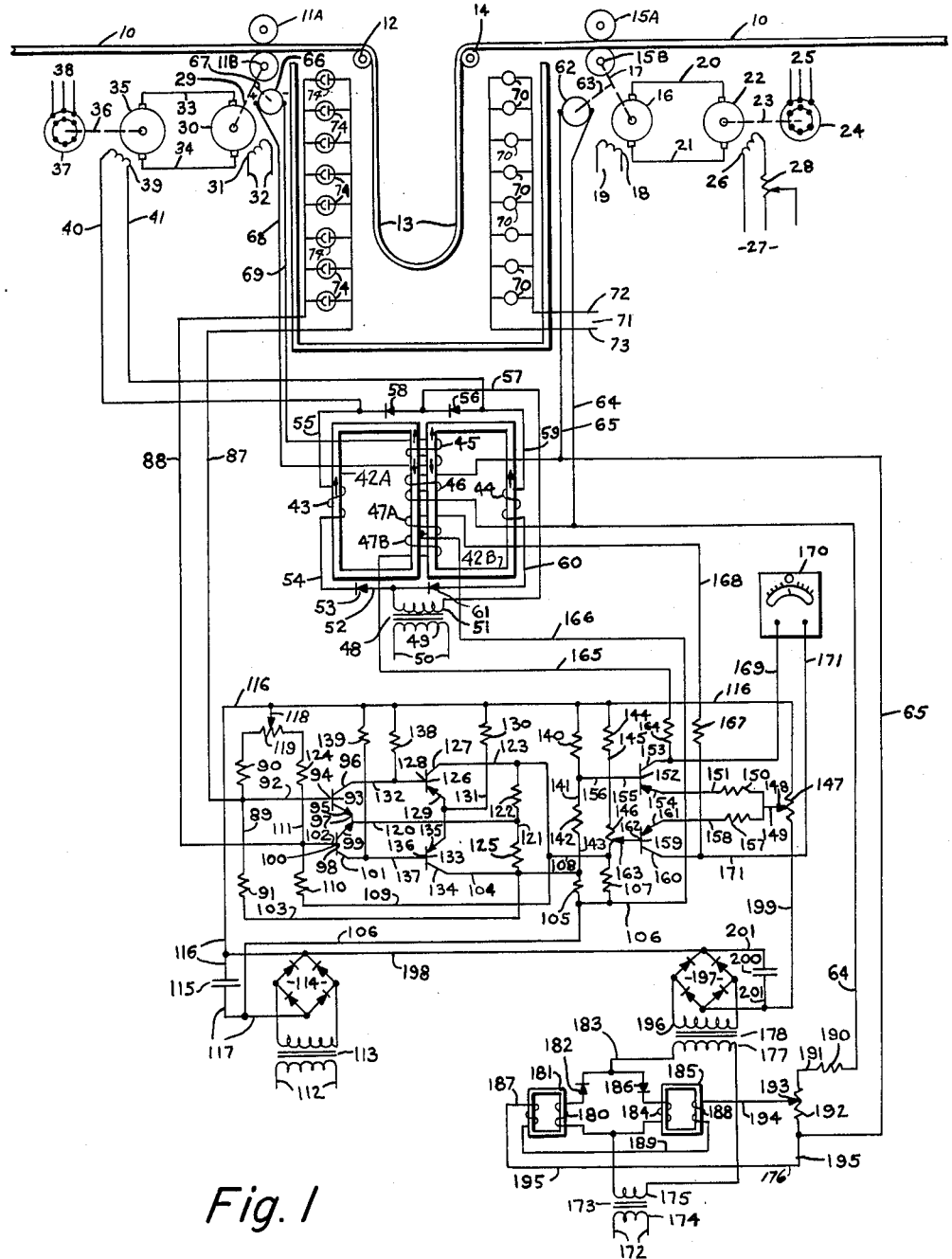
FIG. 1 is a diagrammatic view of the strip and the free hanging loop with the control circuit of the invention.

With reference to FIG. 1, there is shown at 10 a strip of opaque material, such as steel, traveling from left to right in the drawing. The strip is drawn from a process section or a reel by rolls 11A and 11B. The speed at which these rolls are rotating and the speed at which the strip travels therebetween is determined by the control system to be described.

Strip 10 leaves rolls 11A and 11B and travels over a free roller 12 where it depends into a free hanging loop 13. At the other end of loop 13, strip 10 travels over a second free roller 14 and between a second pair of rolls 15A and 15B which draws strip 10 from loop 13.

Rolls 15A and 15B are driven by a D.C. motor 16 through drive shaft 17. D.C. motor 16 has a field winding 18 which is energized from a constant direct current source 19. Motor 16 has its armature connected by wires 20 and 21 to the output of a D.C. generator 22. D.C. generator 22 is connected by a drive shaft 23 and is driven at a substantially constant speed by an induction motor 24. Induction motor 24 is connected to be energized from an A.C. voltage source 25.

D.C. generator 22 has a field winding 26 which is connected to be energized from a D.C. source 27. An adjustable resistor 28 is connected between the D.C. source 27 and field winding 26 so its energization can be adjusted.

With field winding 26 energized at a constant value and generator 22 driven at a constant speed, its output will be constant. Thereby, motor 16 is caused to rotate at a constant speed and drive rolls 15A and 15B at a corresponding constant speed.

Rolls 11A and 11B are connected by a drive shaft 29 to a D.C. motor 30. D.C. motor 30 has a field winding 31 which is energized at a constant value from a D.C. source 32. Motor 30 is connected by wires 33 and 34 to a D.C. generator 35. D.C. generator 35 is connected by a drive shaft 36 to an A.C. alternator 37 which is energized to drive generator 35 at a constant speed from A.C. source 38.

Generator 35 has a field winding 39 which is connected to be variably energized by the output of a magnetic amplifier through wires 40 and 41.

The magnetic amplifier consists of two cores 42A and 42B. A power winding 43 is wound around one leg of core 42A and a power winding 44 is wound around a leg of core 42B.

Control windings 45, 46 and 47 are wound around a leg of each core and are energized to control the level of flux existing in the cores.

The magnetic amplifier is connected by a transformer 48 to a source of alternating current 50. Transformer 48 has a primary winding 49 and a secondary winding 51.

Secondary winding 51 is connected so in one half cycle of the A.C. supply, current flows from secondary winding 51 through a wire 52, a rectifier 53, a wire 54, power winding 43, a wire 55, and wire 40 to energize field winding 39 and then back through wire 41, a rectifier 56, and a wire 57 to the other side of secondary winding 51.

In the other half cycle, current will flow through wire 57, a rectifier 58, wire 40, field winding 39, wire 41, a wire 59, power winding 44, a wire 60, and a rectifier 61 to the first side of secondary winding 51.

The amount of current allowed to flow through these aforedescribed paths in each half cycle, respectively, is determined by the level of flux produced in cores 42A and 42B by the energization of control windings 45, 46 and 47.

Control winding 46 is energized by a D.C. current proportional to the speed of the strip leaving loop 13 which is obtained by a tachometer 62 being connected by a shaft 63 to roller 15B. The output from tachometer 62 flows therefrom through a wire 64 to control winding 46 and back through a wire 65.

Control winding 45 is energized by a D.C. current proportional to the speed of the strip entering loop 13 which is obtained by a tachometer 66 being connected by a shaft 67 to roller 11B. The output of tachometer 66 flows through a wire 68 to control winding 45 and back through a wire 69.

Control winding 47 is divided into two halves 47A and 47B and is energized from the amplifier by a signal which indicates the length of loop 13.

Therefore, it is seen that the magnetic amplifier has a flux level determined by the speed of the material being drawn out of loop 13, the ratio of the desired loop length to the actual loop length and the speed of the strip being fed into loop 13.

When loop 13 is at the desired length and its speed traveling into the loop is the same as its speed traveling out of the loop, the magnetic amplifier output will be only great enough to sustain this position. However, should the length of the loop become too great, the magnetic amplifier reduces its energization of field winding 39 so roller 11B will slow down and reduce the speed at which strip 10 is being fed into loop 13. This action continues until loop 13 reaches the desired length.

As before mentioned, the length of loop 13 is determined by the amount of light from a light source that falls upon a group of photocells.

The light source consists of a vertical bank of lamps 70—70 which are connected in parallel with a source of energy 71 by wires 72 and 73.

At the other side of loop 13 is a vertical bank of photocells disposed directly opposite the individual lamps. Photocells 74 are the well known silicon photovoltaic cells that produce an output current dependent upon the amount of light energy that falls upon their surface. The photosells 74 are connected in parallel so that the output current of the bank is the total of the individual currents produced by each individual photocell.

FIG. 2 illustrates an enclosure for the photocell banks. This consists of an enclosure 75 having a back wall 76 and a front wall 77. Photocell 75 is mounted to back wall 76 by means not shown. Front wall 77 has an aperture 78 therein in direct line with photocell 74. A guard 79 is disposed around the aperture 78 to retain a lens 80 therein.

Attached to back wall 76 is a stud 81 and serves as a support for a baffle 82. Baffle 82 has an aperture 83 therein which is in line directly between lens 80 and photocell 74. Baffle plate 82 is spaced away from back wall 76 by spacers 84 a predetermined distance. A lock washer 85 and a nut 86 on stud 81 secures baffle plate 82 thereon.

It is seen that the baffle plate 82 acts as an adjustable iris for photocell 74 since it can be moved with respect to back wall 76. This is done by removing or adding spacers 84 so that the desired distance is obtained.

The purpose of baffle plate 82 is to ensure that the correct amount of light falls upon photocell 74 regardless of the distance that the light source is placed from the photocell. This requirement is necessary so that the same output can be obtained from the bank of photocells regardless of the light source location. This makes the design applicable to a wide variety of applications.

This is better illustrated by FIG. 3 which shows the graphic representation of what the distance between the baffle plate and the photocell should be in inches for given distances in feet between the light source and the photocell.

Curve A is the distance required when a single vertical bank of photocells and lamps are used and Curve B represents the required distance when a double bank of photocells and lamp sources are used. By the proper spacing as shown in FIG. 3, the output of the parallel connected photocells will be the same for the same length of loop.

It is desirable for the output of the photocells to be connected to a low impedance circuit so the photocells output will be directly proportional to their illumination rather than being influenced by the magnitude of the load resistance. Because the photocells are connected in parallel and since all the photocells are not simultaneously illuminated to the same intensity, it is possible for some of the photocells to deflect current from other photocells which are more strongly illuminated. By terminating the output of photocells into a low impedance amplifier, this effect is minimized. Further, this gives a marked improvement in the temperature operating characteristics of the photocells. Also it reduces any interaction between the photocells due to their non-uniformity.

The output current from the parallel connected photocells 74—74 is conducted therefrom by wire 87 and returned thereto by wire 88.

When light strikes photocells 74—74 current flows therefrom through a wire 87 to a wire 89 that connects a resistor 90 with a resistor 91. Here the current divides into two components, a small signal component and a large feedback component.

The signal component of current flows through a wire 92, the base-emitter circuit 94—95 of a transistor 93, a wire 97, the emitter-base circuit 99–100 of a transistor 98, a wire 102, and wire 88 to photocells 74—74.

The feedback component of current flows through a wire 89, resistor 91, a wire 103, a wire 104, a resistor 105, a wire 106, a resistor 107, a wire 108, a wire 109, a resistor 110, a wire 111 and a wire 88 to photocells 74—74.

Some of the feedback current from wire 104 will flow through a resistor 125, a wire 121, a resistor 122 and a wire 123 to wire 109. However, the current flow through this path is small due to the value of resistors 125 and 122 being large in comparison to the value of resistors 105 and 107.

As will be described, these connections give a negative current feedback to provide the amplifier with a low input impedance so the best operation can be obtained from photocells 74—74 in view of the aforedescribed reasons.

Transistors 93 and 98 have a preset value of bias current. This is obtained from an A.C. source 112 through transformer 113 and full wave rectifier 114. A condenser 115 is connected by wires 116 and 117 across the output of full wave rectifier 114 to filter out any ripples or peaks in its output current.

The base-emitter current for transistor 93 flows from the positive terminal of rectifier 114 through wire 116, tap 118, resistor 119, resistor 90, wire 92, base-emitter 94–95 of transistor 93, wire 97, wire 120, wire 121, resistor 122, wire 123, wire 108, resistor 107, wire 106 and wire 117 to the negative terminal of rectifier 114.

The base-emitter current for transistor 98 flows from the positive terminal of rectifier 114 through wire 116, tap 118, resistor 119, resistor 124, wire 111, wire 102, base-emitter 100–99 of transistor 98, wire 120, wire 121, resistor 125, wire 104, resistor 105, wire 106 and wire 117 to the negative terminal of rectifier 114.

It is to be noted that the current from photocells 74 supplements the base-emitter current of transistor 93 and detracts from the base-emitter current of transistor 98. Therefore, any change in the current from the photocells will have an opposite effect upon transistors 93 and 98.

The collector-emitter circuit 96–95 of transistor 93 conducts and controls the emitter-base current of transistor 126.

This current flow is from the positive terminal of rectifier 114 through wire 116, a resistor 130, a wire 131, the emitter-base circuit 129–128, wire 132, the collector-emitter circuit 96–95 of transistor 93, wire 97, wire 120, wire 121, resistor 122, wire 123, wire 108, resistor 107, wire 106 and wire 117 to the negative terminal of rectifier 114.

The collector-emitter circuit 99–101 of transistor 98 controls the emitter-base current of a transistor 133.

This current flows from the positive terminal of rectifier 114, wire 116, resistor 130, wire 131, emitter-base circuit 135–136, wire 137, collector-emitter circuit 101–99 of transistor 98, wire 120, wire 121, resistor 125, wire 104, resistor 105, wire 106 and wire 117 to the negative terminal of rectifier 114.

A resistor 138 connects wire 116 to wire 132 and a resistor 139 connects wire 116 to wire 137. The purpose of these resistors is to permit the use of readily available NPN transistors for the amplifiers first stage by raising the level of current conducted by them to a practical value. These resistors can be eliminated by the use of special transistors.

The aforedescribed emitter-base currents control the current through the respective transistor emitter-collector circuits as is well known in the art of transistor circuits.

The emitter-collector current for transistor 126 is from the positive terminal of rectifier 114 through wire 116, resistor 130, wire 131, emitter-collector 129–127 of transistor 126, wire 123, wire 108, resistor 107, wire 106 and wire 117 to the negative terminal of rectifier 114.

The emitter-collector current for transistor 133 is from the positive terminal of rectifier 114, wire 116, resistor 130, wire 131, emitter-collector 135–134 of transistor 133, wire 104, resistor 105, wire 106 and wire 117 to the negative terminal of rectifier 114.

Transistors 126 and 133 thus form the second stage of the amplifier and are connected to the first stage so any change in the photocell current will have an opposite effect thereon; i.e., they operate in a differential manner.

It is to be noted that both emitters 95 and 99 of the first stage transistors are connected together by wire 97. This common point is connected by wires 120 and 121 and resistor 122 to the output of transistor 126; and by wires 120 and 121 and resistor 125 to the output of transistor 133. These connections provide a negative voltage feedback so that the difference in output between transistors 126 and 133 will not drift appreciably or be effected by any leakage current through them such as may be caused by a temperature change. This will be described in more detail hereinafter.

A first voltage divider consisting of a resistor 140, a wire 141, a resistor 142, a wire 143 and resistor 105 is connected across wire 116 and wire 106, respectively. The output of transistor 133 is connected to it at wire 141 by wire 104.

A second voltage divider is also connected across wires 116 and 106 and consists of a resistor 144, a wire 145, adjustable resistor 146, wire 108 and resistor 107. The output of transistor 126 is connected to it at wire 108.

Each voltage divider is connected to control the current flowing through the emitter-base circuit of a separate transistor by setting the value of voltage applied to the base. These two transistors form the output or third stage of the amplifier.

The emitter-base current for these transistors flows from rectifier 114 through wire 116, an adjustable resistor 147, a tap 148 to a wire 149. At wire 149 the current divides and one component flows through a resistor 150, a wire 151, the emitter-base circuit 154–155 of transistor 152, a wire 156, wire 141, resistor 142, wire 143, resistor 105, wire 106 and wire 117 to the negative terminal of rectifier 114.

It is seen that this component of current is the emitter-base current for transistor 152 and its value is determined by the potential at wire 156, and this potential is controlled by the output of transistor 133.

The other component of current flows from wire 149 through a resistor 157, a wire 158, the emitter-base circuit 161–162 of transistor 159, a tap 163, adjustable resistor 146, wire 108, resistor 107, wire 106 and wire 117 to the negative terminal of rectifier 114.

It is seen that this component of current is the emitter-base current for transistor 159 and its value is determined by the potential at tap 163, and this potential is controlled by the output of transistor 126.

The emitter-collector current of transistor 152 flows from the positive terminal of rectifier 114 through wire 116, resistor 150, wire 151, the emitter-collector circuit 154–153, a resistor 164, a wire 165, to half 47B of winding 47 and back through wire 166 to wire 106 and wire 117 to the negative terminal of rectifier 114.

The emitter-collector current of transistor 159 flows from the positive terminal of rectifier 114, wire 116, resistor 147, wire 149, resistor 157, wire 158, the emitter-collector circuit 161–160, a resistor 167, a wire 168, half 47A of winding 47 and back through wire 166 to wire 106 and wire 117 to the negative terminal of rectifier 114.

Wire 169 connects collector 153 of transistor 152 to one terminal of an indicating meter 170. A wire 171 connects collector 160 of transistor 159 to the other terminal of meter 170. Meter 170 serves to give a visual indication as to the length of loop 13.

Should the length of loop decrease, more light will fall upon photocells 74. This increases their output since it is proportional to the light falling upon them. Increased current now flows through wire 87 and through the aforedescribed path having the base-emitter circuit 94–95 of transistor 93 and the emitter-base circuit 99–100 of transistor 98.

This increased current flowing through the base-emitter circuit 94–95 of transistor 93 adds to its base-emitter current increasing the conductivity of transistor 93.

This increased current flowing through the emitter-base circuit 99–100 of transistor 98 is in opposition to its base-emitter current decreasing the conductivity of transistor 98.

When transistor 93 increased its conductivity, it conducts more emitter-base current for transistor 126. This increases the conductivity of transistor 126 and the current flowing through its emitter-collector circuit 129–127.

Conversely, since the conductivity of transistor 98 is decreased, it decreases the current flowing through the emitter-base circuit 135–136 of transistor 133. This decreases the conductivity of transistor 133 and the current flowing through its emitter-collector circuit 135–134.

The increased emitter-collector current of transistor 126 flows in the aforedescribed path having wire 123, wire 108, resistor 107 and wire 106 and raises the potential of wire 108 with respect to wire 106. This raises the potential on base 162 of transistor 159 so less current flows through its emitter-base circuit 160–162 to decrease its conductivity.

The decreased emitter-collector current of transistor 133 flows in the aforedescribed path having wire 104, resistor 105 and wire 106 and decreases difference in potential between wires 104 and 106. This decreases the potential on base 155 of transistor 152 so more current will flow through its emitter-base circuit 154–155 and increase its conductivity.

Therefore, it is seen how current from the photocells will control the output of transistors 152 and 159. Should the output of photocells 74 increase due to a decrease in the length of loop 13, the output of transistor 152 will be increased proportionally and the output of transistor 159 will be decreased proportionally. Since these outputs are connected to the windings 47A and 47B of winding 47, whose halves are oppositely wound on cores 42A and 42B, the effect on the magnetic amplifier, will be to increase its output and its energization of shunt field 39.

By increasing the energization of field 39, the output of generator 35 is increased to increase the speed of motor 30 and drive rollers 11B and 11A at a faster speed. This feeds the strip into the pit to lengthen loop 13. As loop 13 lengthens, it reduces the amount of light striking photocells 74 from lamps 70 and the current output therefrom will be decreased.

As the photocell current decreases, the reverse of the aforedescribed action takes place and the output of transistor 159 is increased and the output of transistor 152 is decreased. This has the opposite effect on control windings 47A and 47B and decreases the output of the magnetic amplifier. This regulating action will continue until loop 13 reaches the desired length.

When reached, the energization of control windings 45, 46, 47A and 47B will be sufficient so the magnetic amplifiers have an output whereby rollers 11A and 11B are driven at a speed to maintain the length of loop 13 constant.

Should the speed of rollers 15A and 15B be increased by increasing the energization of field 26, control winding 46 will be increasingly energized proportionally and the output of the magnetic amplifier should be increased to sustain loop 13 at the proper length. However, if it did not, the aforedescribed regulating action would take place to bring loop 13 back to the proper length.

In many commercial applications, it is necessary to provide a system which will operate at both extremity fast and extremely slow speeds of strip travel. Therefore, it is desirable to have the regulating effect proportional to the strip speed and not independent thereof. It is further desirable to have this accomplished automatically which is accomplished as follows.

The control, sometimes known as "taper control," consists of a voltage source in opposition to the voltage produced by rectifier 114. When the speed of strip 10 is slow, the taper voltage is high to reduce the output of transistors 152 and 159. This reduces the amount of correction for a given input signal. Conversely, when the speed of the strip is very high, the taper voltage is very small so the amount of correction for a given input signal is great.

The taper voltage supply is obtained from an A.C. source 172 by means of a transformer 173. Transformer 173 has a primary winding 174 and a secondary winding 175. One side of secondary winding 175 is connected by a wire 176 to a primary winding 177 of a transformer 178.

The other side of secondary 175 is connected to the other side of secondary 177 by a wire 179, a power winding 180 of a reactor 181, a rectifier 182 and a wire 183. Connected in parallel with power winding 180 and rectifier 182 is a second power winding 184 on a reactor 185 and a rectifier 186. Rectifiers 182 and 186 are poled so that in one half cycle current will flow through power winding 180 and rectifier 182 and in the other half cycle current will flow through rectifier 186 and power winding 184.

Reactors 181 and 185 have no bias windings, but do have control windings 187 and 188, respectively. Therefore, when control windings 187 and 188 are not energized, the maximum current can flow through power windings 180 and 184. Control windings 187 and 188 are wound on the reactors so when energized they will provide a flux therein opposing that produced by the respective power windings.

Control windings 187 and 188 are connected in series by a wire 189 and to a source of D.C. voltage obtained from tachometer 62. Current will therefore flow from tachometer 62 by wire 64 through a resistor 190, a wire 191, and a resistor 192 back to wire 65. Resistor 192 has a tap 193 on it so current can flow from it, through wire 194, control winding 188, wire 189, control winding 187, and wire 195 to wire 65. Therefore when strip 10 is travelling at a high speed, tachometer 62 will produce a high voltage causing secondary winding 177 of transformer 178 to be energized with a low value of voltage.

Transformer 178 has a secondary winding 196 which is connected to energize a full wave rectifier 197.

Rectifier 197 has its positive terminal connected to the positive terminal of rectifier 114 by a wire 198 and has its negative terminal connected by wire 199 to taper resistor 147.

Rectifier 197 has a condenser 200 connected by wires 201 and 202 across its output terminals to filter any ripples or peaks from its output.

With the connections described, it is seen that the output voltage from rectifier 197 opposes the supply voltage from rectifier 114 which is used to energize transistors 152 and 159. Thus, when tachometer 62 is operating at a slow or minimum speed, rectifier 197 will have a maximum output and thus will proportionally reduce the outputs of transistors 152 and 159.

Conversely, when tachometer 62 is operating at a very high speed, rectifier 197 will have a low output so that output of transistors 152 and 159 will be at their maximum to thus give the maximum correction.

It is thus seen how transistors 152 and 159 are controlled by the length of loop 13 in the pit to give a signal for correction and how the taper voltage controls the degree of correction permitted dependent upon the speed of strip 10.

It has been stated that the connection of base 94 of transistor 93 by wires 92 and 89, resistor 91 and wire 103 to collector 134 of transistor 133 and of base 100 of transistor 98 by wires 102 and 111, resistor 110 and wires 109 and 123 to collector 127 of transistor 126 gives a negative current feedback so the amplifier has a low input impedance. Further, it has been shown how an increase in photocell current will increase conductivity of transistors 93 and 126 and decrease the conductivity of transistors 98 and 133. Therefore, an increase of photocell current increases the difference of potential between base 94 and collector 134 and more current flows by wire 89, resistor 91 and wire 103 to wire 104. Similarly, it increases the difference of potential between collector 127 and base 100 to further aid the current flowing from wire 106 through wire 109, resistor 110 to wire 111.

Therefore, most of the current from the photocells will flow through the aforedescribed path to give the amplifier a low input impedance. That is, a large change in photocell current accompanied by a small change in voltage is required to produce a change in the amplifier output. As described, the primary reason for having the low impedance input is to obtain the proper and best operation of the photocells.

Should the leakage current of the transistors increase due to change of temperature or other reasons, their output would increase to affect the amplifier output. Further, with the aforedescribed negative current feedback connections, this increase would become cumulative since it would make the bases of the first stage transistors more positive. To eliminate this effect, the aforedescribed negative voltage feedback circuit has been provided.

Assuming that the leakage current through transistors 126 and 133 increases, their outputs are increased proportionally. The increased output raises the positive potential that is reflected back to bases 94 and 100 and the potential thereon is likewise increased. In absence of any countervailing circumstances, this would increase the conductivity of transistors 93 and 98.

However, emitters 95 and 99 are connected together by wire 97 and to collectors 127 and 134 by wires 120 and 121 and resistors 122 and 125, respectively. Thus, the increased output due to the leakage current is reflected by the decreased connections to emitters 95 and 99 and raises their potential. The potential increase on emitters 95 and 99 is slightly higher than the increase on bases 94 and 100. Transistors 93 and 98, both decrease their conductivity so the output of the first and second stage of the amplified returns to its value before the increase in leakage current.

The following is a list of the values of the amplifier components found to operate satisfactorily when connected as described.

| | | |
|---|---|---:|
| Transistors 93, 98, 126 and 133 | | 2N475 |
| Transistors 152 and 159 | | 2N1013 |
| Potentiometer 119 | ohms | 100,000 |
| Potentiometer 146 | ohms | 5,000 |
| Potentiometer 147 | ohms | 1,000 |
| Resistors 90, 124, 138 and 139 | ohms | 15,000 |
| Resistors 91 and 110 | ohms | 10,000 |
| Resistors 140 and 144 | ohms | 22,000 |
| Resistors 150 and 157 | ohms | 4,000 |
| Resistors 105, 107, 164 and 167 | ohms | 500 |
| Resistors 122 and 125 | ohms | 1,500 |
| Resistor 130 | ohms | 2,500 |
| Resistor 142 | ohms | 4,700 |
| Rectifier 114 Output | volts | 105 |

Although I have described by invention with a certain degree of particularity, it is understood that the above disclosure has been made only by way of example as required by law and that many changes in the details of circuitry may be resorted to by those skilled in the art without departing from the spirit and the scope of my invention as hereinafter claimed.

Various modes of carrying out the invention are contemplated as being within the scope of the following claims particularly pointing out and distinctly claiming the subject matter which is regarded as the invention.

I claim:

1. In a strip loop control system for maintaining a loop in a strip of traveling material at a constant length, a bank of self-generating solar cells disposed to one side of the loop, said cells being parallel connected to produce a summed output, a light source disposed to illuminate the cells for direct generation of a low current signal proportional to the light energy impinging on the cells, controlled drive means for transferring said strip through said loop, a first pair of similar type transistors having their inputs connected to opposite ends of the solar cells to bias said transistors in opposite directions, a second pair of opposite type transistors and having inputs connected respectively one each to the outputs of the first pair of transistors, the output of said second pair of transistors being connected to actuate the drive means, and feedback means from the output of said second pair of transistors to the input of the first pair of transistors for reducing the impedance of said first pair and thereby permitting said direct coupling of the solar cells to said first pair of transistors.

2. The control system of claim 1 wherein said transistors each have a base, collector and emitter; said first pair of transistors having the bases connected to the solar cells, the emitters connected together; said second pair of transistors having the bases connected to the collectors of the first pair of transistors, the emitters tied together and the collectors tied to the drive means; means connecting the collectors of the second pair together and to said emitters of said first pair and connecting each of said collectors to the base of the opposite transistor in the first pair to produce said signal feedback and thereby permitting connection of said cells directly to said first pair of transistors.

3. The control system of claim 1 having a plurality of lens and adjustable iris assemblies interposed one each between the light source and each solar cell, said loop depending between the cells and the lens and adjustable iris assemblies and closely regulating the output current to increase and decrease as said loop lengthens and shortens.

4. In a strip loop control system for maintaining a loop in a strip of travelling material at a constant length, a bank of self-generating solar cells disposed to one side of the loop, said cells being parallel connected to produce a summed output, a light source disposed to illuminate the cell for direct generation of a low current signal proportional to the light energy impinging on the cells, controlled drive means for transferring said strip through said loop, a first pair of similar type transistors having their bases connected one each to opposite sides of the paralleled cells and having their emitters direct connected; bias means connected to said bases; a second pair of transistors of a type opposite said first pair and having their bases connected one each to each of the collectors of said first pair and to a bias means and having their emitters direct coupled to a bias means; a voltage dividing means coupling the collectors of said second pair and having an intermediate point connected to the emitters of said first pair; and feedback means to cross-connect the output collectors of said second pair to the bases of said pair, said feedback means biasing said first pair to present a low impedance to said cells and permit the direct coupling thereof.

5. The control system of claim 4 having a pair of output transistors having their bases connected one each to the collectors of said second pair and having common connected emitters and the collectors connected to said motor means.

6. In a control system for maintaining a loop in a strip of travelling material at a constant length, motor means for propelling the strip through the loop, a bank of parallel connected self-generating light responsive cells mounted to one side of the loop, a light source for illuminating the cells and generating a current in accordance with the light energy impinging on the cells, a plurality of lens and adjustable iris assemblies interposed one each between the light source and each cell, the loop depending between the cells and the lens and adjustable iris assemblies and causing the output current to be increased and decreased as the loop lengthens and shortens, and control means for changing the speed of the motor means, said control means being connected to the bank of cells and responsive to changes in the output current to change the speed of said motor.

7. In a control system for closely maintaining a loop in a strip of travelling material at a constant length, motor means for propelling the strip through the loop, a bank of self-generating light responsive cells connected in parallel and each generating a current directly from light energy impinging thereon, a light source for illuminating the cells and thereby establishing a signal current, said loop depending between the bank of cells and the light source and causing the signal current to increase and decrease as the loop shortens and lengthens, an amplifier having an input circuit and an output circuit, a lead means connecting the bank of photocells directly to the input circuit, said input circuit being of a low impedance to prevent loading of the photocells, control means connected to the output of the amplifier and to the motor for adjusting the speed of the motor in correspondence with the amplified output.

8. A control system as described in claim 6 and where the iris assemblies each includes a baffle plate adjustably mounted with respect to the corresponding cell so the amount of light impinging upon the respective cells can be made constant independent of the distance between the cells and the light source.

9. In a control system for maintaining a loop in a strip of traveling material at a constant length; a first motor propelling the strip into the loop; a second motor propelling the strip out of the loop; a bank of parallel connected self-generating light cells producing an output current in response to light impinging thereon; a light source for illuminating the cells and cause them to produce an output current; the loop depending between the cell bank and the light source causing the photocell output current to be increased or decreased as the loop shortens or lengthens, means for varying the speed of the first motor, said means including an amplifier having a low impedance input circuit, lead means connecting said input circuit directly to said cells to be energized by the output current of the cells and responsive to an increase or decrease of the cell output current to effect respectively an increase or decrease of the first motors speed.

10. A control system as described in claim 9 and where addition means is provided for obtaining a voltage signal proportional to the speed of the strip leaving the loop and to energize the amplifier with the voltage signal whereby the rate at which the first motor speed is increased or decreased is proportional to the strip speed.

References Cited by the Examiner
UNITED STATES PATENTS

| | | | |
|---|---|---|---|
| 2,422,651 | 6/1947 | Ayers | 226—118 X |
| 2,897,370 | 7/1959 | Sauter | 226—45 X |
| 2,907,565 | 10/1959 | Sauter | 226—45 |
| 3,047,198 | 7/1962 | Long | 226—42 |
| 3,077,566 | 2/1963 | Vosteen | 330—14 |
| 3,135,447 | 6/1964 | Raymond | 226—42 |
| 3,142,019 | 7/1964 | Favin | 330—14 |

M. HENSON WOOD, JR., *Primary Examiner.*

ERNEST A. FALLER, ROBERT B. REEVES,
*Examiners.*